United States Patent
Jenkins et al.

(10) Patent No.: US 11,924,343 B2
(45) Date of Patent: Mar. 5, 2024

(54) MECHANISM FOR ENABLING CRYPTOGRAPHIC AGILITY IN LEGACY APPLICATIONS AND SERVICES

(71) Applicant: VMware LLC, Palo Alto, CA (US)

(72) Inventors: Akeem Jenkins, Broomfield, CO (US); Mark Benson, Workingham (GB); Daniel James Beveridge, Apollo Beach, FL (US); Marc Wayne Brotherson, Boulder, CO (US); Sean Huntley, NSW (AU); David Ott, Chandler, AZ (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/385,401

(22) Filed: Jul. 26, 2021

(65) Prior Publication Data

US 2023/0023529 A1    Jan. 26, 2023

(51) Int. Cl.
    *H04L 9/08* (2006.01)
    *H04L 9/06* (2006.01)
    *H04L 9/40* (2022.01)

(52) U.S. Cl.
    CPC ............ *H04L 9/088* (2013.01); *H04L 9/0631* (2013.01); *H04L 9/0819* (2013.01); *H04L 63/0428* (2013.01)

(58) Field of Classification Search
    None
    See application file for complete search history.

(56) References Cited

U.S. PATENT DOCUMENTS

| | | | |
|---|---|---|---|
| 9,900,287 B1 * | 2/2018 | Jooste | H04L 63/0428 |
| 10,454,689 B1 * | 10/2019 | Sharifi Mehr | H04L 63/166 |
| 11,153,074 B1 | 10/2021 | Nikitas et al. | |
| 2011/0185178 A1 | 7/2011 | Gotthardt | |
| 2012/0072721 A1 | 3/2012 | Rescorla et al. | |
| 2012/0275598 A1 * | 11/2012 | Vimpari | H04L 9/0872 380/255 |
| 2014/0245004 A1 * | 8/2014 | Houston | H04W 12/02 713/168 |
| 2017/0093585 A1 | 3/2017 | Lee | |
| 2017/0289104 A1 * | 10/2017 | Shankar | H04L 63/166 |
| 2023/0026560 A1 | 1/2023 | Brotherson et al. | |

FOREIGN PATENT DOCUMENTS

| | | | | |
|---|---|---|---|---|
| EP | 3664407 A1 * | 6/2020 | | H04L 12/4633 |
| WO | WO-2018118051 A1 * | 6/2018 | | G06F 9/45537 |

* cited by examiner

*Primary Examiner* — Benjamin E Lanier
(74) *Attorney, Agent, or Firm* — King Intellectual Asset Management

(57) ABSTRACT

The disclosure provides an approach for cryptographic agility. Embodiments include establishing, by a proxy component associated with a cryptographic agility system, a first secure connection with an application. Embodiments include receiving, by the proxy component, via the first secure connection, a communication from the application directed to an endpoint. Embodiments include selecting, by the cryptographic agility system, a cryptographic technique based on contextual information related to the communication. Embodiments include establishing, by the proxy component, a second secure connection with the endpoint based on the cryptographic technique. Embodiments include transmitting, by the proxy component, a secure communication to the endpoint via the second secure connection based on the communication.

14 Claims, 4 Drawing Sheets

MECHANISM FOR ENABLING CRYPTOGRAPHIC AGILITY IN LEGACY APPLICATIONS AND SERVICES

BACKGROUND

Cryptography generally involves techniques for protecting data from unauthorized access. For example, data transmitted over a network may be encrypted in order to protect the data from being accessed by unauthorized parties. For example, even if the encrypted data is obtained by an unauthorized party, if the unauthorized party cannot decrypt the encrypted data, then the unauthorized party cannot access the underlying data. There are many types of cryptographic algorithms, and these algorithms vary in many aspects such as key size, ciphertext size, memory requirements, computation requirements, amenability to hardware acceleration, failure handling, entropy requirements, and the like. Key size refers to the number of bits in a key used by a cryptographic algorithm. Ciphertext size refers to the number of bits in the output from a cryptographic algorithm, which may be the same as the number of bits of the input or may include padding to produce a larger number of bits than the input. Memory requirements and computation requirements generally refer to the amount of memory and processing resources required to perform an algorithm. Amenability to hardware acceleration generally refers to whether an algorithm requires or can be improved through the use of a hardware accelerator. For example, a compute accelerator is an additional hardware or software processing component that processes data faster than a central processing unit (CPU) of the computer. Failure handling refers to the processes by which an algorithm accounts for failures, such as recovering keys that are lost or deactivated. Entropy requirements generally refer to the amount of randomness required by an algorithm, such as an extent to which randomly generated values are used as part of the algorithm (e.g., which generally improves security of the algorithm).

Some cryptographic algorithms may result in a higher level of security (e.g., having more bits of security, more layers of security, larger amounts of entropy, and/or the like) than others, and there may be trade-offs with respect to resource requirements such that higher-security algorithms may require larger amounts of storage, processing, and/or communication resources (e.g., involving the transmission of larger amounts of information over a network). Furthermore, new cryptographic algorithms and libraries are developed on an ongoing basis to meet changing security needs. Cryptographic libraries are collections of cryptographic algorithms that can be invoked, such as through calls to application programming interface (API) functions provided by the libraries, in order to perform various cryptographic functions (e.g., encryption of data, establishing secure connection channels, and/or the like). In some cases, weaknesses in particular algorithms may be discovered over time such as due to advances in computing technology (e.g., a particular algorithm may be susceptible to being compromised through the use of computing devices with more power than the computing devices that were in use at the time the algorithm was developed). For example, algorithms may become problematic and/or become less useful for a variety of reasons, such as due to algorithmic compromise (e.g., a weakness in the algorithm may be discovered and/or exploited), compute performance increases (e.g., the time required to "guess correctly" may be reduced), and/or the like. In some cases, new and/or updated algorithms may be developed to address these issues (e.g., by adding additional bits of security, additional layers of security, more complex forms of encryption, and/or the like).

The rise of quantum computing has raised the possibility of additional issues related to cryptography. For example, the high levels of computational power provided by quantum computing may enable nefarious actors to more easily access data secured with existing cryptographic algorithms, thereby gaining access to sensitive data that was previously believed to be secure.

The dynamic nature of computing technology and the variety of threats that exist to data security necessitate a continuous adapting of cryptography to meet these new circumstances and threats. Furthermore, laws and/or regulations may require certain types of cryptography to be utilized in certain contexts. Thus, compliance with such laws and/or regulations may further necessitate adopting of new and/or different types of cryptographic algorithms.

Conventional software applications are generally designed to implement and/or utilize particular cryptographic algorithms. These algorithms may be customizable in certain respects, but there is generally no convenient mechanism for changing the cryptographic algorithms utilized by an application without modifying the base code of the application, essentially requiring portions of the application code to be rewritten, which is time consuming and difficult. Such code modifications are expensive and error-prone, particularly when done on a regular basis to address the ever-changing landscape of computing security.

As such, there is a need for improved cryptography techniques that allow for cryptographic agility.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
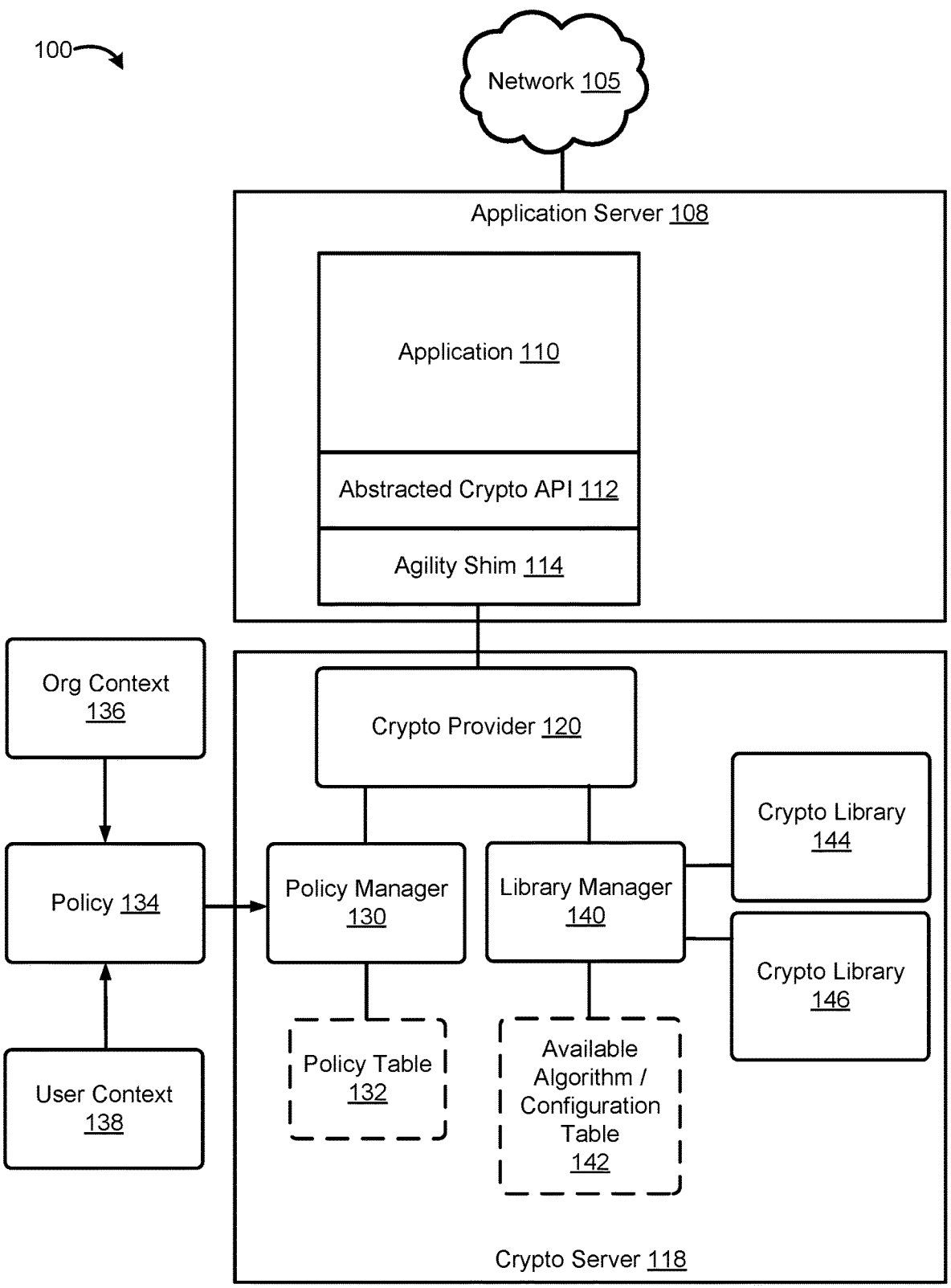
FIG. 1 is an illustration of example computing components related to cryptographic agility, according to embodiments of the present disclosure.

The present disclosure relates to cryptographic agility. In particular, the present disclosure provides an approach for enabling cryptographic agility in legacy applications and services that may not include native cryptographic agility functionality.

Cryptographic agility generally refers to techniques for dynamic selection and/or configuration of cryptographic algorithms. According to certain embodiments, logic related to selection and/or configuration of cryptographic algorithms is decoupled from the applications that utilize cryptographic functionality, and is implemented in one or more separate components, which may be located in a proxy component. For example, the proxy component may be a software or hardware component that intercepts communications to and from an application (e.g., based on one or more routing table entries that cause such communications to be redirected to the proxy component). The proxy component may provide cryptographic agility functionality through the use of a cryptographic agility system that selects cryptographic algorithms and/or configurations based on contextual information (e.g., related to the communications that are intercepted).

For example, the proxy component may communicate with the application using cryptographic techniques natively supported by the application, while communicating with a remote endpoint (e.g., client device) using dynamically selected cryptographic techniques. Thus, rather than relying on cryptographic functionality provided by the application, embodiments of the present disclosure involve dynamic cryptography that is provided by a separate cryptographic agility system, and the cryptographic agility system may then select and/or configure cryptographic algorithms, such as based on contextual information and/or policies. For instance, the cryptographic agility system may dynamically determine which libraries, algorithms, configuration values, and/or the like to select based on factors such as the type of data being encrypted, the type of application requesting encryption, the network environment(s) in which the data is to be sent, a destination to which encrypted data is to be sent, geographic locations associated with a source and/or destination of the data, attributes of users associated with the encryption, regulatory environments related to the encryption, network conditions, resource availability, performance constraints, device capabilities, and/or the like.

Dynamically selecting cryptographic techniques based on resource constraints is described in more detail in U.S. patent application Ser. No. 17/385,287, filed Jul. 26, 2021, the contents of which are incorporated by reference herein in their entirety.

For example, policies may be defined by users (e.g., administrators), and may specify rules for selecting and/or configuring cryptographic algorithms. In one example, cryptographic techniques (e.g., algorithms and/or configurations of algorithms) are tagged with different levels of security (e.g., rated from 0-10), and a policy associated with an application may specify that all data that is to be transmitted from the application to a destination in a given type of networking environment, such as a public network, is to be encrypted using a high-security algorithm (e.g., rated 8 or higher). Thus, if the application sends data (e.g., whether encrypted directly by the application or not) that is intercepted by the proxy component, and contextual information indicates that the data is to be transmitted to a device on a public network, then the cryptographic agility system, in certain embodiments, will select a cryptographic algorithm tagged as a high-security algorithm, such as with a security rating of 8 or higher.

By decoupling cryptographic logic from applications that rely on cryptographic functionality, and utilizing a proxy component to provide cryptographic agility to the applications, techniques described herein provide flexibility and extensibility, thus allowing cryptographic algorithms to be continually updated, changed, and otherwise configured without requiring modifications to the applications themselves. Accordingly, changing circumstances and new threats may be addressed in a dynamic and efficient manner, and computing security may thereby be improved.

According to embodiments of the present disclosure, a proxy component allows cryptographic agility to be provided as an overlay that does not require any changes to the underlying applications. For example, the proxy component may be located on the same device as an application, and may receive all incoming and outgoing communications related to the application, such as via one or more entries in a routing table that cause these communications to be redirected to the proxy component. In some embodiments, the proxy component terminates a secure connection (e.g., transport layer security (TLS) connection) with the application based on a cryptographic technique supported by the application. Generally, a TLS termination proxy is a proxy component that acts as an intermediary point between a client and a server application, and is used to terminate and/or establish TLS connections by decrypting and/or encrypting communications. For instance, the proxy component may communicate with the application via a first secure connection based on a cryptographic technique supported by the application, and may establish a second secure connection with a remote endpoint based on a dynamically-selected cryptographic technique (e.g., that may not be natively supported by the application).

For example, the application may attempt to establish a secure connection with a client device via one or more communications, and the proxy component may intercept these communications and establish the requested secure connection with the application. From the perspective of the application, it has established a secure connection with the client device. However, the secure connection is actually between the application and the proxy component. The proxy component may then utilize a cryptographic agility system, as described herein, to dynamically select a cryptographic technique for establishing a separate secure connection between the proxy component and the client device.

In a cryptographic agility system, an initial stage of selecting a cryptographic technique may involve ensuring that the security requirements for a given cryptographic operation, such as a level of security required by policy and/or context information, are met. In some cases, there may be multiple algorithms and/or configurations of algorithms that meet these requirements. Resource-related considerations may also be factored into the determination of which algorithms and/or configurations to use, such as based on device and/or network performance metrics and/or capability information. In one example, the cryptographic agility system selects a cryptographic technique with a highest security rating of those that comply with all relevant policies and/or resource constraints related to communications between the application and the client device.

Thus, the cryptographic agility system may select algorithms and/or configurations of algorithms that are best suited to the context, resource availability, performance, and/or capabilities of the applications, devices, and/or networks associated with communications between the application and the client device.

When a given communication is received by the proxy component from the application and directed to the client device, the proxy component may decrypt the given communication based on the encryption technique corresponding to the secure connection between the application and the proxy device. Subsequently, the proxy component may re-encrypt the decrypted communication based on the encryption technique corresponding to the secure connection between the proxy device and the client device (e.g., the dynamically-selected cryptographic technique), and transmit the re-encrypted communication to the client device. The same process may be performed in reverse for communications from the client device to the application.

In some cases, cryptographic algorithms and/or configurations of algorithms may be dynamically switched over time based on changing circumstances. For example, if a client device moves from a low-latency network to a high-latency network (such as the latency of a network that device is coupled to changes), the cryptographic agility system may switch from a cryptographic algorithm that requires a large amount of network resources to an alternative cryptographic algorithm that requires smaller amounts of network resources (e.g., a lower security algorithm that still meets the security requirements for the cryptographic operation), and may switch back if the device moves again into a lower-latency network. These changing circumstances may be determined by the cryptographic agility system based on contextual information related to each communication from the application to the client device and vice-versa.

As such, embodiments of the present disclosure improve upon conventional cryptography techniques in which cryptographic algorithms are pre-determined for applications (e.g., at design time) by allowing cryptographic algorithms and/or configurations to be dynamically selected and changed over time based on contextual information, even if an application was not designed to support such functionality. For example, by utilizing a proxy device to intercept communications between applications and other endpoints, and selecting cryptographic algorithms and/or configurations based on contextual information, techniques described herein improve the security and functioning of devices and networks on which cryptographic operations are performed, such as by, in certain embodiments, ensuring that the most secure and updated cryptographic techniques that are consistent with device and network constraints may be utilized by an application, even if such techniques were not available at the time the application was developed.

Additionally, techniques described herein may facilitate an organization's use of uniform policy configuration (e.g., a suite of coordinated policies), such as to orchestrate cryptographic usage across many hosts (e.g., for federated data centers deployed worldwide). Embodiments of the present disclosure may also be used to facilitate migration to new cryptographic algorithms at scale and/or to remove deprecated cryptographic algorithms from use in a centralized and coordinated manner.

FIG. 1 is an illustration 100 of example computing components related to cryptographic agility, according to embodiments of the present disclosure.

An application server 108 is connected to a network 105. In certain embodiments, application server 108 may be a physical or virtual computing device, such as a server computer, that hosts an application 110. In some embodiments, application server 108 may be a virtual computing instance (VCI), such as a virtual machine (VM) or container that runs on a physical host computer. Network 105 may be any sort of network over which data may be transmitted, such as a local area network (LAN), cellular network, satellite-based network, the Internet, or the like. It is noted that application server 108 is included as an example computing device on which application 110 and/or associated components may be located, and other types of devices may also be used.

Application 110 generally represents a software application that requires cryptographic functionality. For example, application 110 may rely on cryptographic functionality to encrypt data that it transmits over a network (e.g., network 105), such as to one or more client devices that interact with application 110 (e.g., accessing content provided by application 110). While conventional techniques generally involve direct integration of cryptographic libraries with applications that rely on cryptographic functionality, techniques described herein involve abstracting cryptographic functionality away from applications. As such, an agility shim 114 provides an abstracted crypto application programming interface (API) 112 as a means of facilitating cooperation between application 110 and a separate cryptographic agility system. As described in more detail below with respect to FIG. 2, agility shim 114 may be located within a proxy component that intercepts communications between application 110 and external endpoints such as client devices.

The proxy component may call generic cryptographic functions of abstracted crypto API 112 in order to invoke particular cryptographic functionality, and the cryptographic agility system may select cryptographic techniques and perform cryptographic operations in response to the function invocations based on contextual information. Thus, while application 110 may or may not provide its own cryptographic functionality, all communications between application 110 and external endpoints may be processed through a separate cryptographic agility system that dynamically selects and implements cryptographic techniques for use in encrypting communications to and from the external endpoints.

The cryptographic agility system includes agility shim 114 and abstracted crypto API 112 as well as crypto provider 120, policy manager 130, and library manager 140. In some embodiments, while depicted as separate components, agility shim 114, abstracted crypto API 112, policy manager 130, and/or library manager 140 may be part of crypto provider 120. In certain embodiments, abstracted crypto API 112 and/or agility shim 114 are part of a proxy component located on application server 108. In alternative embodiments, abstracted crypto API 112 and/or agility shim 114 may be located on a proxy component separate from application server 108, such as on crypto server 118 or a different computing device.

Agility shim 114 may comprise a library, and generally intercepts API calls (e.g., calls to functions of abstracted crypto API 112) and redirects them to crypto provider 120. Shims generally allow new software components to be integrated with existing software components by intercepting, modifying, and/or redirecting communications. As such, agility shim 114 allows a proxy component associated with application 110 to interact with crypto provider 120 even though the proxy component and application 110 itself may have no knowledge of crypto provider 120. For instance, the proxy component may make generic cryptographic function calls (e.g., requesting that an item of data be encrypted), and these generic function calls may be intercepted by agility shim 114 and redirected to crypto provider 120.

It is noted that while embodiments of the present disclosure are depicted on application server 108 and crypto server 118, alternative embodiments may involve various components being located on more or fewer computing devices. In some cases, aspects of the cryptographic agility system may be implemented in a distributed fashion across a plurality of computing devices. In certain embodiments, said components may be located on a single computing device.

In certain embodiments, crypto server 118 comprises a physical or virtual computing device, such as a server computer, on which components of the cryptographic agility system, such as crypto provider 120, policy manager 130, and/or library manager 140, reside. For example, crypto server 118 may represent a VCI or a physical computing device. Crypto server 118 may be connected to network 105 and/or one or more additional networks.

Crypto provider 120 generally performs operations related to dynamically selecting cryptographic techniques (e.g., based on contextual information related to requests for cryptographic operations), performing the requested cryptographic operations according to the selected techniques, and providing results of the operations to the requesting components. Cryptographic techniques may include cryptographic algorithms (e.g., included in one or more libraries) and/or specific configurations of cryptographic algorithms, as described herein. In some embodiments, the cryptographic agility system is located on the same device as application 110, while in other embodiments the cryptographic agility system is located on a separate device, such as on a server that is accessible over a network. According to certain embodiments, policies are defined by an enterprise administrative team deploying an application such as application 110, rather than being defined by an application user. Accordingly, policies may be used to determine (e.g., on behalf of application users) which cryptographic techniques to use (e.g., based on organizational policies). Policy-based selection of cryptographic techniques may be based on contextual information related to a cryptographic request.

In certain aspects, crypto provider 120 has two major subsystems, policy manager 130 and library manager 140. Policy manager 130 performs operations related to cryptographic policies, such as receiving policies defined by users and storing information related to the policies in a policy table 132. In an example, a policy 134 is based on one or more of an organizational context 136 and a user context 138 related to a cryptographic request.

Organizational context 136 may involve geographic region (e.g., country, state, city and/or other region), industry mandates (e.g., security requirements of a particular industry, such as related to storage and transmission of medical records), government mandates (e.g., laws and regulations imposed by governmental entities, such as including security requirements), and the like. For instance, policy 134 may indicate that if a cryptographic request is received in relation to a device (e.g., client device or other device, such as application server 108) associated with a particular geographic region, associated with a particular industry, and/or within the jurisdiction of a particular governmental entity, then crypto provider 120 must select a cryptographic technique that meets one or more conditions (e.g., having a particular security rating and/or being configured to protect against particular types of threats) in order to comply with relevant laws, regulations, or mandates.

User context 138 may involve user identity (e.g., a user identifier or category, which may be associated with particular privileges), data characteristics (e.g., whether the data is sensitive, classified, or the like), application characteristics (e.g., whether the application is a business application, an entertainment application, or the like), platform characteristics (e.g., details of an operating system), device characteristics (e.g., hardware configurations and capabilities of the device, resource availability information, and the like), device location (e.g., geographic location information, such as based on a satellite positioning system associated with the device), networking environment (e.g., a type of network to which the device is connected, such as a satellite or land-based network connection), and/or the like. For example, policy 134 may indicate that if a cryptographic request is received in relation to a particular category of user (e.g., administrators, general users, or the like), relating to a particular type of data (e.g., tagged as sensitive or meeting characteristics associated with sensitivity, such as being financial or medical data), associated with a particular application or type of application, associated with a particular platform (e.g., operating system), associated with a device with particular capabilities or other attributes (e.g., a client or server device having a certain amount of processing or memory resources, or having an accelerator), and/or in relation to a device in a particular location (e.g., geographic location) or type of networking environment (e.g., cellular network, satellite-based network, land network, or the like), then crypto provider 120 should select a cryptographic technique that meets one or more conditions. In some cases, a policy 134 may relate to resource constraints (e.g., based on available processing, memory, or network resources), such as specifying that cryptographic techniques must be selected based on resource availability (e.g., how much of a device's processing and/or memory resources are currently utilized, how much latency is present on a network, and the like) and/or capabilities (e.g., whether a device is associated with an accelerator) associated with devices and/or networks, while in other embodiments crypto provider 120 selects cryptographic techniques based on resource constraints independently of policy manager 130 (e.g., for all cryptographic requests regardless of whether any policies are in place). For example, policies may only relate to security levels of cryptographic techniques, such as requiring the use of cryptographic techniques associated with particular security ratings when certain characteristics are indicated in contextual information related to a cryptographic request, and resource constraints may be considered separately from policies. In one example, once all cryptographic techniques meeting the security requirements for a cryptographic request are identified based on policies, a cryptographic technique is selected from these policy-compliant cryptographic techniques based on resource constraints.

Policy table 132 stores information related to policies, such as policy 134. In some embodiments, policy table 132 maps various contextual conditions (e.g., relating to organizational context 136 and/or user context 138) to cryptographic technique characteristics (e.g., security ratings, threats protected against, resource utilization ratings, and the like). For example, a contextual condition may be the use of a certain type of application, a certain type of data, or a particular geographic location. A cryptographic technique characteristic may be, for example, a security rating (e.g., 0-10), whether the cryptographic technique is quantum-safe, what level of resource requirements the cryptographic technique has for a particular type of resource (e.g., memory, processor, or network resources), or the like. Thus, when cryptographic requests are received, policy table 132 is used to determine whether the cryptographic requests are associated with any characteristics included in policies and, if so, what cryptographic technique characteristics are required by the policies for servicing the requests.

Library manager 140 generally manages cryptographic libraries containing cryptographic algorithms. For example crypto libraries 144 and 146 each include various cryptographic algorithms, each of which may include configurable parameters, such as key size or ciphertext size. For instance, cryptographic techniques (e.g., algorithms and/or specific configurations of algorithms) may be registered with library manager 140 along with information indicating characteristics of the cryptographic techniques. Examples of algorithms include data encryption standard (DES), triple DES, advanced encryption standard (AES), and Rivest-Shamir-Adleman (RSA). An algorithm may, for example, involve symmetric key encryption or asymmetric key encryption. A configuration of an algorithm may include values for one or more configurable parameters of the algorithm, such as key size, size of lattice, which elliptic curve is utilized, number of bits of security, whether accelerators are used, ciphertext size, and/or the like. A characteristic of a cryptographic technique may be, for example, a security rating, a resource requirement rating, whether the technique requires an accelerator, whether the technique is quantum-safe, or the like. A cryptographic technique may include more than one cryptographic algorithm and/or configuration. In an example, each cryptographic technique is tagged (e.g., by an administrator) based on characteristics of the technique, such as with a security rating, an indication of threats protected against by the technique, indications of the resource requirements of the technique, and/or the like.

Information related to cryptographic techniques registered with library manager 140 is stored in available algorithm/configuration table 142. For instance, available algorithm/configuration table 142 may store identifying information of each available cryptographic technique (e.g., an identifier of a library, an identifier of an algorithm in the library, and/or one or more configuration values for the algorithm) associated with tags indicating characteristics of the technique. It is noted that policies and tags are examples of how cryptographic techniques may be associated with indications of characteristics, and alternative implementations are possible. For instance, rather than associating individual cryptographic techniques with tags, alternative embodiments may involve associating higher-level types of cryptographic techniques with tags, and associating individual cryptographic techniques with indications of types. For example, a higher-level type of cryptographic technique may be "symmetric key encryption algorithms configured with a key size of 200 bits or larger." Thus, if tags are associated with this type (e.g., including security ratings, recourse requirement ratings, and the like), any specific cryptographic techniques of this type (being symmetric key encryption algorithms, and being configured with a key size of 200 bits or more) will be considered to be associated with these tags. In another example, fuzzy logic and/or machine learning techniques may be employed, such as based on historical cryptographic data indicating which cryptographic techniques were utilized for cryptographic requests having particular characteristics.

By allowing cryptographic techniques and libraries to be registered and deregistered with library manager 140 on an ongoing basis, embodiments of the present disclosure allow the pool of possible cryptographic techniques to be continuously updated to meet new conditions and threats. For example, as new libraries are developed, these libraries may be added to library manager 140, and the cryptographic techniques in the library may be used by crypto provider 120 in servicing requests from application 110 without application 110 having any awareness of the new libraries. Similarly, by managing policies and libraries separately, policies may be defined in an abstract manner (e.g., based on characteristics of requests and cryptographic techniques) such that policies may be satisfied through the selection of new cryptographic techniques that were not known at the time of policy creation.

In one particular example, a new cryptographic technique is tagged as quantum safe, meaning that the cryptographic technique was developed to be resistant to being decoded by quantum computers. For instance, the new cryptographic technique may have a high security rating (e.g., 10 out of 10) as well as high resource requirements. The new cryptographic technique is registered with library manager 140, and information about the new cryptographic technique and its characteristics is stored in available algorithm/configuration table 142. Thus, the new cryptographic algorithm is available to be selected by crypto provider 120 for servicing cryptographic requests from the proxy component related to application 110.

Continuing with the example, a policy 134 states that cryptographic requests relating to data that is long-lived (e.g., of a type that must be protected over a long amount of time, such as many years) is to be encrypted using a quantum-safe cryptographic technique if such a technique is available, unless device and/or network resource constraints prohibit the use of such a technique. Long-lived data may include, for example, classified government data, certain types of personally-identifiable information, and the like. Data that is not long-lived may include, for example, a code or password that expires after a short amount of time, a credit card number that is updated at regular intervals, network configuration data that changes on a regular basis, and the like.

Thus, when the proxy component related to application 110 submits a cryptographic request (e.g., via a call to a generic cryptographic function provided by abstracted crypto API 112) to encrypt an item of long-lived data (e.g., received from application 110 and direct to an endpoint), crypto provider 120 determines based on information stored in policy table 132 that a quantum-safe cryptographic technique is to be used if possible. Crypto provider 120 determines based on information in available algorithm/configuration table 142 that the new cryptographic technique is quantum-safe. Next, crypto provider 120 analyzes resource constraints related to the cryptographic request to determine if the new cryptographic technique can be performed. If crypto provider 120 determines that the device and/or network associated with application 110 can support the new cryptographic technique (e.g., based on available resources), then crypto provider 120 selects the new cryptographic technique for servicing the cryptographic request, and provides a response to the proxy component (e.g., via agility shim 114) accordingly. Use of a proxy component to enable cryptographic agility for legacy applications and services is described in more detail below with respect to FIGS. 2-4. In some cases, the response sent from crypto provider 120 to the proxy component includes data encrypted using the selected technique. In other cases, the response includes information related to performing the selected technique to encrypt the data, and the encryption is performed by the entity from which the request was sent.

In some cases, more than one cryptographic technique may be selected for servicing a given cryptographic request. For instance, an item of data may first be encrypted using a first technique (e.g., that satisfies one or more first conditions related to policy and/or resource considerations) and then the encrypted data may be encrypted again using a second technique (e.g., that satisfies one or more second conditions related to policy and/or resource considerations).

Figure 2:
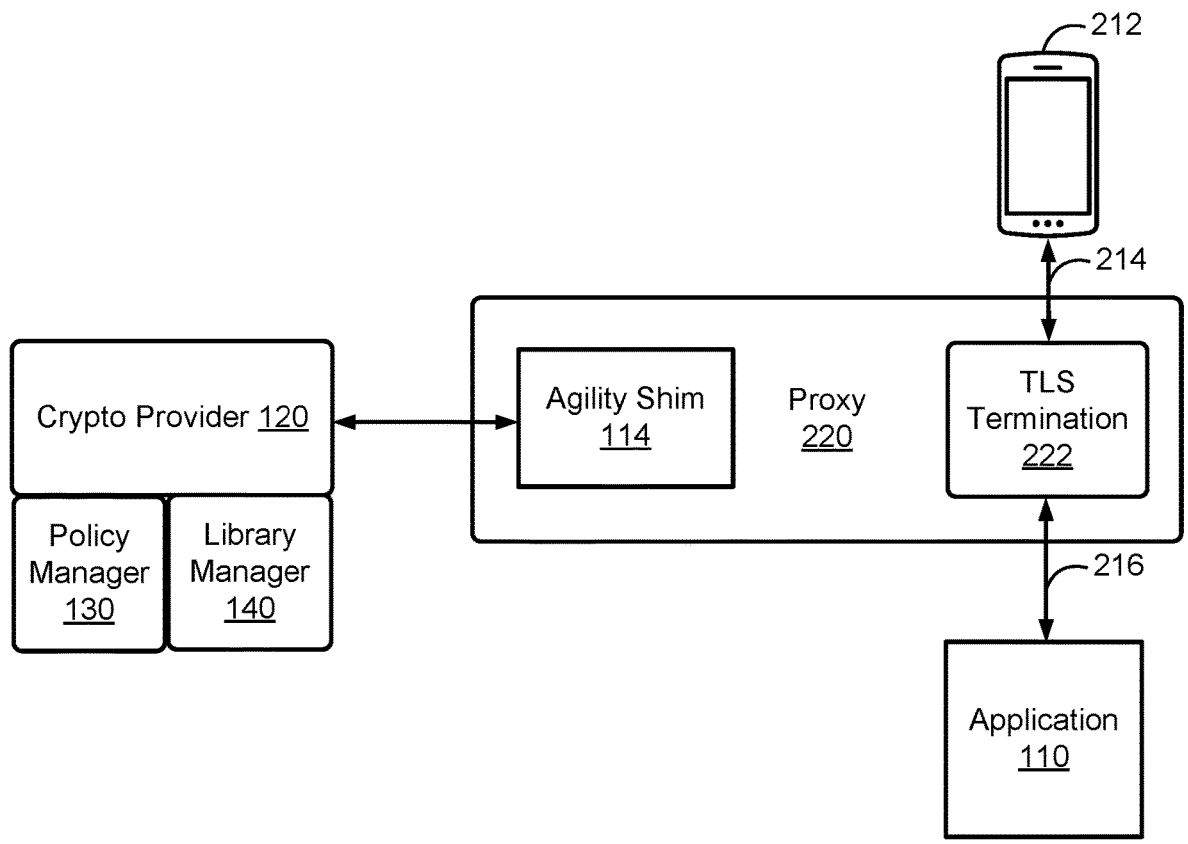
FIG. 2 is an illustration of an example related to enabling cryptographic agility in legacy applications and services.

FIG. 2 is an illustration 200 of an example related to enabling cryptographic agility in legacy applications and services. Illustration 200 includes application 110, agility shim 114, crypto provider 120, policy manager 130, and library manager 140 of FIG. 1.

Client device 212 is generally representative of a device by which a user interacts with an application, such as application 110, which may be located remotely from client device 212, such as on application server 108 of FIG. 1. Client device 212 may transmit one or more communications to application 110, such as to establish a secure connection for communication. In another embodiment, application 110 transmits one or more communications to client device 212 to establish a secure connection. The communications between client device 212 and application 110 are intercepted by proxy 220.

Proxy 220 generally represents a proxy component that enables cryptographic agility for legacy applications and services. In one embodiment, proxy 220 is a software component that resides on the same device as application 110 (e.g., application server 108 of FIG. 1). Proxy 220 may be a TLS termination proxy. In certain embodiments, proxy 220 is a reverse proxy, which generally refers to a component that sits in front of a web server and forwards client (e.g. web browser) requests to that web server. Reverse proxies are typically implemented to help increase security, performance, and reliability. In the present case, proxy 220 is implemented to provide cryptographic agility for applications and services that may not offer native support for such functionality. In one example, application 110 is a web server and client device 212 runs a web browser that communicates with application 110 over one or more networks, such as network 105 of FIG. 1.

In one embodiment, proxy 220 is integrated within a network interface control (NIC), such as a SmartNIC, associated with a computing device on which application 110 resides, such as application server 108 of FIG. 1. A SmartNIC is a network adapter that offloads processing tasks that the system CPU would conventionally perform. Using its own processing resources, a SmartNIC may perform, for example, encryption/decryption, firewall, TCP/IP and HTTP processing. In some cases, SmartNICs are utilized for high-traffic Web servers. Thus, a SmartNIC that includes proxy 220 may enable cryptographic agility for applications associated with the SmartNIC. In other embodiments, proxy 220 is not integrated with a NIC, and is a separate software or hardware component that is associated with application 110.

Proxy 220 offers TLS termination 222, by which it terminates a first TLS connection with application 110 and/or a second TLS connection with client device 212. For instance, proxy 220 may communicate with application 110 via a first TLS connection that is based on a cryptographic technique supported by application 110, and may communicate with client device 212 via a second TLS connection that is based on a cryptographic technique dynamically selected by crypto provider 120 based on contextual information related to the communication between client device 212 and application 110.

In an example, client device 212 sends a request for content to application 110, and the request is intercepted by proxy 220. Proxy 220 then negotiates a secure connection 216 with application 110 based on the request from client device 212, with application 110 believing that proxy 220 is its client. Secure connection 216 between proxy 220 and application 110 may be based on a cryptographic technique natively supported by application 110.

Proxy 220 establishes a separate secure connection 214 with client device 212 based on the request, with client device 212 believing that proxy 220 is application 110. Secure connection 214 is established based on a dynamically-selected cryptographic technique.

In an example, proxy 220 calls a function of an abstracted crypto API provided by agility shim 114, which then sends a corresponding crypto request to crypto provider 120, such as for establishing the second secure connection. Crypto provider 120 determines whether there are any policies applicable to the crypto request, such as based on whether any contextual information related to the request (e.g., relating to client device 212, application 110, and/or the type of content being requested from application 110) corresponds to a policy. If any policies apply, crypto provider 120 will ensure that any cryptographic techniques selected comply with the applicable policies.

Crypto provider 120 may also consider resource constraints related to client device 212 and/application 110 when selecting cryptographic techniques. For instance, crypto provider 120 may gather performance metrics indicating one or more of current and/or historic processor and memory availability on client device 212 and/or a device associated with application 110, and/or information about capabilities of client device 212 (e.g., total amount of processing and memory resources, whether client device 212 supports accelerator functionality, whether device 212 supports particular types of cryptographic techniques, processing speed of device 212, and/or the like) and/or the device associated with application 110. Furthermore, in some embodiments, crypto provider 120 may gather information about one or more networks related to the request, such as a type of network (e.g., satellite-based, land network, or the like) and/or network performance information (e.g., latency, throughput, packet loss, and/or the like).

Crypto provider 120 then selects a cryptographic technique for servicing the crypto request based on any applicable policies and the gathered contextual information. For instance, upon determining that client device 212 is located on a satellite-based network and/or a network that has a high latency, crypto provider 120 may select a cryptographic technique with a low network resource utilization rating.

In some cases, crypto provider 120 may select a cryptographic technique based on tags associated with the cryptographic technique, such as indicating the security rating and/or resource requirements of the cryptographic technique. Crypto provider 120 may first determine which potential cryptographic techniques comply with applicable policies (e.g., meeting a required security rating), and may then determine which of those policy-compliant techniques are consistent with the resource constraints related to the crypto request. Finally, crypto provider 120 may select a cryptographic technique from a subset of available cryptographic techniques that includes those techniques that are both policy-compliant and resource-compliant. For example, crypto provider 120 may select the most secure cryptographic technique in the set of policy-compliant and resource-compliant techniques.

Crypto provider 120 then provides a response to proxy 220 based on the selected cryptographic technique, such as including data related to the selected cryptographic technique, to enable proxy 220 to establish secure connection 214 with client device 212.

Thus, communications sent from application 110 to client device 212 are intercepted by proxy 220 via secure connection 216, decrypted as appropriate (e.g., based on the cryptographic technique associated with secure connection 216), re-encrypted using the dynamically-selected cryptographic technique, and sent to client device 212 via secure connection 214. Likewise, communications from client device 212 sent to application 110 are intercepted by proxy 220 via secure connection 214, decrypted using the dynamically-selected cryptographic technique, re-encrypted as appropriate (e.g., based on the cryptographic technique associated with secure connection 216), and sent to application 110 via secure connection 216.

The dynamically-selected cryptographic technique associated with client device 212 may be changed over time, such as due to changed circumstances. For example, if client device 212 moves from a high-latency satellite network to a low-latency land network, crypto provider 120 may select an alternative cryptographic technique with a higher security rating and a higher network resource requirement, and proxy 220 may change secure connection 214 to be based on the alternative cryptographic technique to improve security. If client deice 212 then moves back to a high-latency network, the cryptographic technique may be switched back again.

Thus, cryptographic agility may be enabled even for legacy applications and services that do not offer native support for cryptographic agility, without requiring any changes to the legacy applications and services.

In some embodiments, proxy 220 may be configured to operate in a "pass-through mode," such as when the underlying application is already configured to meet the cryptographic requirements that would otherwise be met by the cryptographic agility system via proxy 220. For example, a user may enable pass-through mode or pass-through mode may be automatically enabled, such as upon determining that an application (e.g., application 110) does not require the functionality provided by proxy 220. For example, proxy 220 may determine, through communication with application 110, one or more encryption techniques natively supported by application 110, and determine based on these techniques whether to enable pass-through mode. In pass-through mode, proxy 220 may not decrypt or re-encrypt communications to and from application 110, and may instead allow the communications to pass through (e.g., without modification).

In some embodiments, a policy may specify conditions under which pass-through mode may be enabled. For example, a policy may specify that if context information indicates that an application natively supports one or more cryptographic techniques (e.g., having certain characteristics), then pass-through mode may be enabled. Pass-through mode may increase performance, as cryptographic techniques native to an application are likely to be faster than those implemented separately from the application.

Figure 3:
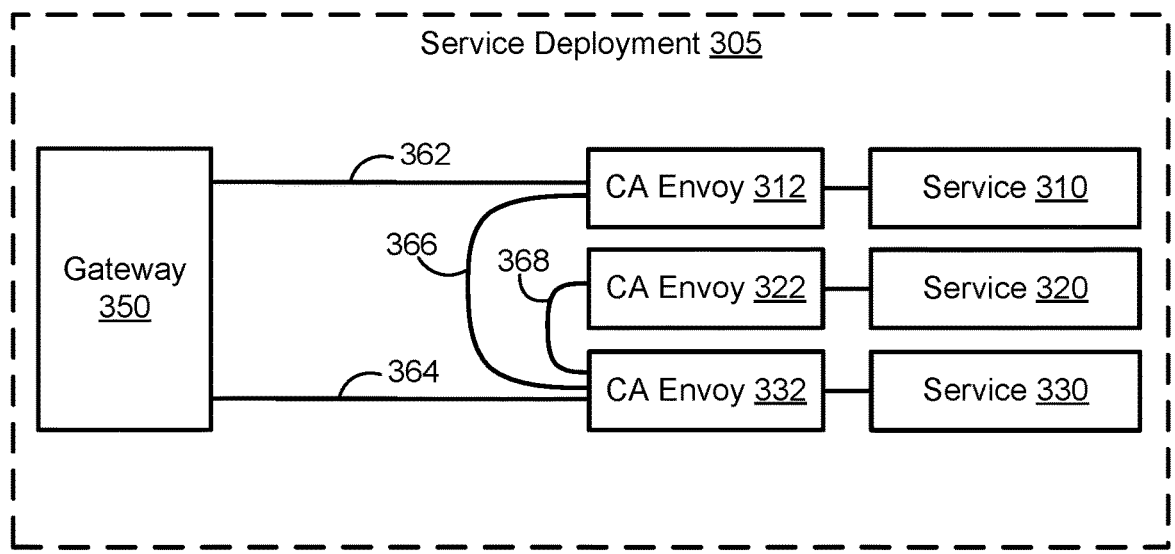
FIG. 3 is an illustration of another example related to enabling cryptographic agility in legacy applications and services.

FIG. 3 is an illustration 300 of another example related to enabling cryptographic agility in legacy applications and services. In particular, illustration 300 shows how techniques described herein can be implemented in a service deployment where a plurality of services (e.g., microservices) work together to perform common functionality.

Service deployment 305 may represent a solution such as platform as a service (PAAS) or container as a service (CAAS), and may include containers that are created within various VCIs on a hypervisor. Platform as a service (PAAS) and container as a service (CAAS) solutions like Kubernetes®, OpenShift®, Docker Swarm®, Cloud Foundry®, and Mesos® provide application level abstractions that allow developers to deploy, manage, and scale their applications. PAAS is a service that provides a platform that allows users to develop, run, and manage applications without the complexity of building and maintaining the infrastructure typically associated with launching an application. For example, a user can control software deployment with minimal configuration options, while the PAAS provides services to host the user's application. CAAS is a form of container-based virtualization in which container engines, orchestration, and the underlying compute resources are delivered to users as a service from a cloud provider. These solutions provide support for compute and storage but do not generally provide native networking support. As such, software defined networking (SDN) may be utilized to provide networking for the containers. For example, after a new container is scheduled for creation, an SDN control plane generates network interface configuration data that can be used by the container host VM (i.e., the VM hosting the container) to configure a network interface for the container. The configured network interface for the container enables network communication between the container and other network entities, including containers hosted by other VMs on the same or different hosts.

In some embodiments, a service instance is implemented in the form of a pod that includes multiple containers, including a main container and one or more sidecar containers, which are responsible for supporting the main container. For instance, a main container may be a content server and a sidecar container may perform logging functions for the content server, with the content server and the logging sidecar container sharing resources such as storage associated with the pod. A service deployment may include one or more pods, individual containers, VMs, and/or other VCIs.

In service deployment 305, services 310, 320, and 330 may represent main containers and cryptographic agility (CA) envoys 312, 322, and 332 may represent sidecar containers. Each of CA envoys 312, 322, and 332 may represent a proxy component similar to proxy 220 of FIG. 2, and may enable cryptographic agility for its corresponding service 310, 320, or 330.

For example, CA envoy 312 may intercept communications to and from service 310. CA envoy 312 may include an agility shim similar to agility shim 114 of FIGS. 1 and 2 that forwards cryptographic requests from CA envoy 312 to a crypto provider similar to crypto provider 120 of FIGS. 1 and 2 for dynamic selection of cryptographic techniques as described herein.

CA envoys 312, 322, and 332 may provide cryptographic agility both for communications within service deployment 305 (e.g., communications 366 and 368) and between services 310, 320, and 330 and endpoints external to service deployment 300 (e.g., communications 362 and 364, transmitted via gateway 350). Gateway 350 generally represents an edge gateway that enables communication between services 310, 320, and 330 and endpoints external to service deployment 300, such as external client devices.

Policies may govern the dynamic selection of cryptographic techniques for communications within service deployment 305 and between service deployment 305 and external endpoints. A crypto provider, including a policy manager and library manager, similar to crypto provider 120, policy manager 130, and library manager 140, may be located adjacent to service deployment 305, such as on the same physical host machine, and provides centralized policy-governed cryptographic agility for all of the services within service deployment 305. For example, policies may specify that communications within service deployment 305 are to be encrypted using low-security cryptographic techniques and that communications between service deployment 305 and external endpoints are to be encrypted using higher-security cryptographic techniques. Thus, administrators may be able to exercise granular control over various types of communications related to service deployment 305, and the administrator-defined policies may be implemented through dynamically-selected cryptographic techniques that are decoupled from the underlying services 310, 320, and 330, and from the policies, as described herein.

Accordingly, a service mesh is provided that allows dynamic, extensible, and orchestrated configuration of cryptography to be utilized. A service mesh is generally an infrastructure that is built into a distributed application (e.g., service deployment 305) and governs how the components (e.g., services 310, 320, and 330) of the application communicate with one another. The use of CA envoys 312, 322, and 332 enables cryptographic agility for such a service mesh without requiring any changes to the underlying services, removing the management of policies and cryptographic libraries from the services themselves.

Figure 4:
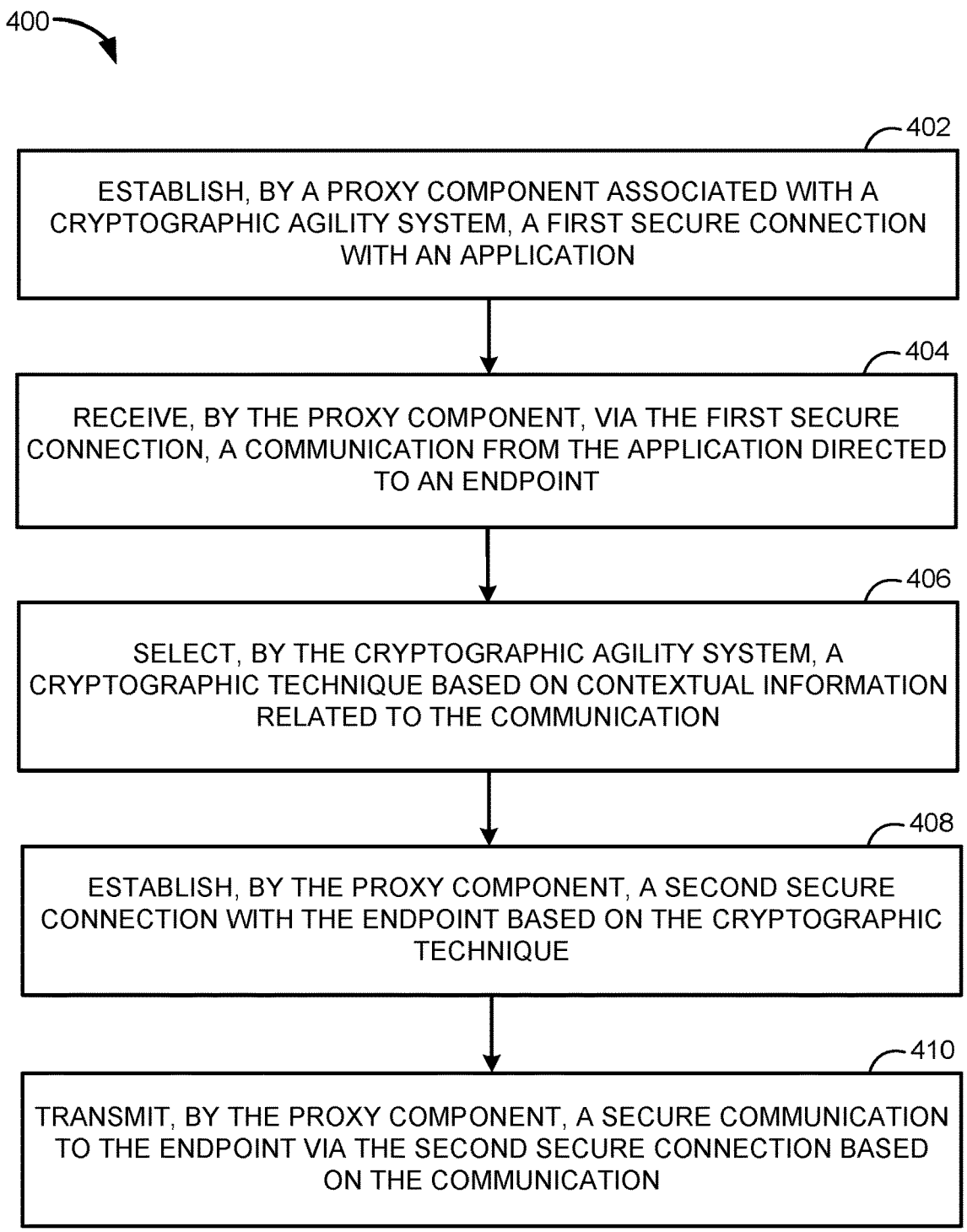
FIG. 4 depicts example operations related to enabling cryptographic agility in legacy applications and services according to embodiments of the present disclosure.

FIG. 4 depicts example operations 400 related to enabling cryptographic agility in legacy applications and services according to embodiments of the present disclosure. For example, operations 400 may be performed by one or more components of the cryptographic agility system described above with respect to FIGS. 1-3.

Operations 400 begin at step 402, with establishing, by a proxy component associated with a cryptographic agility system, a first secure connection with an application. In certain embodiments, the application may not provide native support for the cryptographic technique. In some embodiments, the proxy component is integrated with a network interface controller of a computing device related to the application. For example, the proxy component may be included in the network interface controller.

Certain embodiments further include determining, by the proxy component, that the application does not provide native support for the cryptographic technique and determining, by the proxy component not to enable a pass-through mode.

Operations 400 continue at step 404, with receiving, by the proxy component, via the first secure connection, a communication from the application directed to an endpoint.

Operations 400 continue at step 406, with selecting, by the cryptographic agility system, a cryptographic technique based on contextual information related to the communication. In some embodiments, selecting the cryptographic technique is based on one or more resource constraints related to the endpoint and/or one or more policies associated with the cryptographic agility system. Selecting the cryptographic technique may comprise selecting a cryptographic algorithm and one or more configuration parameters related to the cryptographic algorithm.

Operations 400 continue at step 408, with establishing, by the proxy component, a second secure connection with the endpoint based on the cryptographic technique.

Operations 400 continue at step 410, with transmitting, by the proxy component, a secure communication to the endpoint via the second secure connection based on the communication. In some embodiments, the secure communication is generated through a process comprising decrypting the communication based on an additional cryptographic technique associated with the application to produce a decrypted communication, and encrypting the decrypted communication using the cryptographic technique.

Some embodiments further include receiving, by the proxy component, an additional communication from the endpoint via the second secure connection, decrypting, by the cryptographic agility system, the additional communication based on the cryptographic technique, and transmitting, by the proxy component, a corresponding communication to the application via the first secure connection based on the decrypting of the additional communication.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of cryptographic agility, comprising:
    establishing, by a proxy component associated with a cryptographic agility system, a first secure connection with an application, wherein the first secure connection is based on a first cryptographic technique;
    receiving, by the proxy component, via the first secure connection, a communication from the application directed to an endpoint;
    issuing, by the proxy component, a request to the cryptographic agility system to provide cryptographic functionality with respect to the communication, wherein the request comprises an invocation of a generic cryptographic function provided by the cryptographic agility system, wherein contextual information related to the request indicates one or more processing, memory, or network resource constraints of the endpoint, and wherein the endpoint is separate from the cryptographic agility system;
    selecting, by the cryptographic agility system in response to the request, a second cryptographic technique based on the contextual information;
    providing, by the cryptographic agility system to the proxy component, a response to the request, wherein the response indicates the second cryptographic technique;
    establishing, by the proxy component, based on the response, a second secure connection with the endpoint based on the second cryptographic technique;
    decrypting, by the proxy component, the communication based on the first cryptographic technique to produce a decrypted communication;
    re-encrypting the decrypted communication based on the second cryptographic technique to produce a secure communication; and
    transmitting, by the proxy component, the secure communication to the endpoint via the second secure connection based on the communication.

2. The method of claim 1, further comprising:
    receiving, by the proxy component, an additional communication from the endpoint via the second secure connection;
    decrypting, by the cryptographic agility system, the additional communication based on the second cryptographic technique; and
    transmitting, by the proxy component, a corresponding communication to the application via the first secure connection based on the decrypting of the additional communication.

3. The method of claim 1, wherein selecting the second cryptographic technique is based on one or more policies associated with the cryptographic agility system.

4. The method of claim 1, wherein selecting the second cryptographic technique comprises selecting a cryptographic algorithm and one or more configuration parameters related to the cryptographic algorithm.

5. The method of claim 1, wherein the proxy component is integrated with a network interface controller of a computing device related to the application.

6. The method of claim 1, further comprising:
    determining, by the proxy component, that the application does not provide native support for the second cryptographic technique; and
    determining, by the proxy component not to enable a pass-through mode.

7. A system for cryptographic agility, comprising:
    at least one memory; and
    at least one processor coupled to the at least one memory, the at least one processor and the at least one memory configured to:
        establish, by a proxy component associated with a cryptographic agility system, a first secure connection with an application, wherein the first secure connection is based on a first cryptographic technique;
        receive, by the proxy component, via the first secure connection, a communication from the application directed to an endpoint;
        issue, by the proxy component, a request to the cryptographic agility system to provide cryptographic functionality with respect to the communication, wherein the request comprises an invocation of a generic cryptographic function provided by the cryptographic agility system, wherein contextual information related to the request indicates one or more processing, memory, or network resource constraints of the endpoint, and wherein the endpoint is separate from the cryptographic agility system;

select, by the cryptographic agility system in response to the request, a second cryptographic technique based on the contextual information;

provide, by the cryptographic agility system to the proxy component, a response to the request, wherein the response indicates the second cryptographic technique;

establish, by the proxy component, based on the response, a second secure connection with the endpoint based on the second cryptographic technique;

decrypt, by the proxy component, the communication based on the first cryptographic technique to produce a decrypted communication;

re-encrypt the decrypted communication based on the second cryptographic technique to produce a secure communication; and transmit, by the proxy component, the secure communication to the endpoint via the second secure connection based on the communication.

8. The system of claim 7, wherein the at least one processor and the at least one memory are further configured to:

receive, by the proxy component, an additional communication from the endpoint via the second secure connection;

decrypt, by the cryptographic agility system, the additional communication based on the second cryptographic technique; and transmit, by the proxy component, a corresponding communication to the application via the first secure connection based on the decrypting of the additional communication.

9. The system of claim 7, wherein selecting the second cryptographic technique is based on one or more policies associated with the cryptographic agility system.

10. The system of claim 7, wherein selecting the second cryptographic technique comprises selecting a cryptographic algorithm and one or more configuration parameters related to the cryptographic algorithm.

11. The system of claim 7, wherein the proxy component is integrated with a network interface controller of a computing device related to the application.

12. A non-transitory computer-readable medium storing instructions that, when executed by one or more processors, cause the one or more processors to:

establish, by a proxy component associated with a cryptographic agility system, a first secure connection with an application, wherein the first secure connection is based on a first cryptographic technique;

receive, by the proxy component, via the first secure connection, a communication from the application directed to an endpoint;

issue, by the proxy component, a request to the cryptographic agility system to provide cryptographic functionality with respect to the communication, wherein the request comprises an invocation of a generic cryptographic function provided by the cryptographic agility system, wherein contextual information related to the request indicates one or more processing, memory, or network resource constraints of the endpoint, and wherein the endpoint is separate from the cryptographic agility system;

select, by the cryptographic agility system in response to the request, a second cryptographic technique based on the contextual information;

provide, by the cryptographic agility system to the proxy component, a response to the request, wherein the response indicates the second cryptographic technique;

establish, by the proxy component, based on the response, a second secure connection with the endpoint based on the second cryptographic technique;

decrypt, by the proxy component, the communication based on the first cryptographic technique to produce a decrypted communication;

re-encrypt the decrypted communication based on the second cryptographic technique to produce a secure communication; and transmit, by the proxy component, the secure communication to the endpoint via the second secure connection based on the communication.

13. The non-transitory computer-readable medium of claim 12, wherein the instructions, when executed by one or more processors, further cause the one or more processors to:

receive, by the proxy component, an additional communication from the endpoint via the second secure connection;

decrypt, by the cryptographic agility system, the additional communication based on the second cryptographic technique; and transmit, by the proxy component, a corresponding communication to the application via the first secure connection based on the decrypting of the additional communication.

14. The non-transitory computer-readable medium of claim 12, wherein selecting the second cryptographic technique is based on one or more policies associated with the cryptographic agility system.

* * * * *